United States Patent [19]

Ruckel et al.

[11] 4,377,510
[45] Mar. 22, 1983

[54] URETHANE-MODIFIED ROSIN ESTER AND PROCESS FOR PREPARING THE SAME

[75] Inventors: Erwin R. Ruckel, Wilton; Martin Epstein, Norwalk, both of Conn.

[73] Assignee: Arizona Chemical Company, Fairlawn, N.J.

[21] Appl. No.: 325,701

[22] Filed: Nov. 30, 1981

[51] Int. Cl.³ .............................................. C08L 93/00
[52] U.S. Cl. ....................................... 260/97; 260/104; 524/187
[58] Field of Search ................. 260/97, 104; 525/54.4; 524/187; 527/600

[56] References Cited

U.S. PATENT DOCUMENTS 3,692,720  9/1972  Sloan ................................. 260/103
3,718,712  2/1973  Tushans ............................. 525/458
4,172,070 10/1979  Schaner ............................. 260/104

OTHER PUBLICATIONS

Shimizu et al., Chem. Abs. 92, 112450c–Water–Based Printing Inks–Japan Kokai Tokkyo Koho 79,143,306–Nov. 8, 1979.

Shearing, Chem. Abs. 90,206039m–Coating Process, U.K. 1,537,039, Dec. 29, 1978.

Nogawa, Derwent 55817, Nov. 12, 1982, Abstract of Japan Patent 146348.

Primary Examiner—H. S. Cockeram
Attorney, Agent, or Firm—Gordon L. Hart

[57] ABSTRACT

A urethane-modified ester of rosin and a primary polyhydric alcohol has negligible hydroxyl content and is particularly useful as a polar tackifier in an adhesive composition made with a polar elastomer. The modified ester is prepared by reacting a rosin ester, for example, a rosin-pentaerythritol ester which contains some residual hydroxyl groups with a suitable isocyanate or diisocyanate.

9 Claims, No Drawings

URETHANE-MODIFIED ROSIN ESTER AND PROCESS FOR PREPARING THE SAME

The invention relates to urethane-modified rosin-primary polyhydric alcohol esters having greatly reduced hydroxyl content over that of conventional rosin esters and a method for making them. The modified esters are useful as polar tackifiers in adhesive compositions made with polar elastomers. The modified esters are made by reacting a conventional rosin-primary polyhydric alcohol ester, such as a rosin-pentaerythritol ester, having residual hydroxyl groups, with an aromatic or aliphatic isocyanate to produce a urethane-modified rosin ester in which residual hydroxyl groups in the ester have been reacted with the isocyanate. This modification enhances the compatibility of the esters with polar elastomers. The modified rosin esters, and particularly the modified rosin-pentaerythritol esters, of the present invention, are therefore improved for use as polar tackifiers in adhesive compositions based on polar elastomers.

The preparation of rosin esters of polyhydric primary alcohols, such as esters of rosin and pentaerythritol, is well known. One method for preparing these esters was described in U.S. Pat. No. 4,172,070 to Scharrer et al. Other methods for preparing such esters are also known and some have been described in references that were cited in the aforementioned Scharrer et al patent. In the esterification reactions, all of the hydroxyl groups of the alcohol have not been reacted with the rosin. Thus, for example, rosin-pentaerythritol esters prepared by a conventional method will contain from 0.2 to 2.0 residual, unesterified hydroxyl group per pentaerythritol moiety. The presence of residual hydroxyl groups in rosin pentaerythritol esters makes them essentially unsuitable for use as additives in adhesive compositions that are made by polymerization of reactive monomers such as diols and isocyanates. The presence of residual hydroxyl groups in the ester additive when present during formation of a polyurethane elastomer for example would interfere with the polymerization reaction.

We have discovered that rosin esters having residual hydroxyl groups such as rosin-pentaerythritol esters, can be modified to make them useful as additives, e.g. as tackifiers, in adhesive compositions made with polar elastomers. Conventional rosin-pentaerythritol esters are rendered polar by the present invention so that the modified ester will be compatible with a polar elastomer in an adhesive composition, thereby filling a long-felt need in the adhesive art.

Additives and tackifiers in adhesive compositions made with elastomers must be reasonably compatible with the elastomers to be effective. Polyurethane elastomers are compatible with tackifiers having roughly the same solubility parameters. A comparative measure of compatibility can be obtained from the degree of solubility of an elastomer and a tackifier in a mixed solvent system. For example, the solubility in ethanol-methylethyl ketone mixtures at the 20 wt % level can be used as a guage for polarity. Tackifiers and elastomers having similar polarities will have similar solubilities. Unmodified rosin esters, on the other hand, will be nonpolar and will have substantially different solubility.

In accordance with our invention, improved additives for use in adhesive compositions are prepared by reacting an unmodified rosin ester of a polyhydric primary alcohol (having about 50 to about 95% of the hydroxyl groups of the alcohol esterified with rosin) with an aliphatic or aromatic isocyanate, for example, phenyl isocyanate or toluene-2,4-diisocyanate. The residual unesterified hydroxyl groups of the unmodified rosin ester will be reacted with the isocyanate, so that the modified ester will be completely reacted, to the point that the modified ester has negligible hydroxyl content.

According to the process of the invention, from about 0.2 mole to 4.0 moles of an aromatic isocyanate is mixed with one mole of the rosin ester of a primary polyhydric alcohol, for example, 0.2 mole to 2.0 mole of an aromatic isocyanate is mixed with one mole of rosin-pentaerythritol ester with a solvent if needed, and the reaction is carried out at a temperature in the range from about 25° C. to about 200° C. preferably under an inert gas such as nitrogen. The product, which we may refer to as a urethane-modified rosin ester, will have negligible hydroxyl content.

The modified rosin esters of the invention are polar, hence can be readily dissolved in an alkylene glycol. This solution is admixed with a diisocyanate, making a coating mixture which may then be coated on a substrate, such as a polyester film (Mylar® film). Upon polymerization the coating becomes a polyurethane which is satisfactorily tackified by the polar urethane modified rosin ester additive. Urethane elastomer coatings of this kind but with other tackifiers are described in U.S. Pat. No. 3,718,712. By contrast, without any tackifying additive or with an unmodified rosin-pentaerythritol ester additive, the coating on the Mylar® substrate will have deficient adhesive properties.

By the term "negligible hydroxyl content" we mean a residual unesterified hydroxyl content in the modified ester which is less than 2.0% of the original number of hydroxyl groups in the primary polyhydric alcohol.

The invention is explained in more detail by reference to specific examples described below. Unless otherwise specified, the parts are by weight.

EXAMPLE 1

Preparation of a Modified Rosin Pentaerythritol by Reaction with Phenyl Isocyanate In a suitable 3-necked flask fitted with a stirrer, thermometer, and dropping funnel, were added 6000 parts of a commercial rosin-pentaerythritol ester, having the following properties: MW (molecular weight)=965; AN (acid number) of 9.1; degree of esterification of 3.13/4.00 (as determined by nuclear magnetic resonance). The ester was melted and heated to a temperature of about 150°–155° C. under nitrogen atmosphere and 573 parts of phenyl isocyanate (MW=119.1, b.p.=165° C., density=1.1 g/ml) were added dropwise with stirring under a nitrogen atmosphere over a period of two hours. After an additional one-half hour, a sample was removed and analyzed by infrared spectroscopy (IR). Isocyanate was found to be in excess by the presence of a band in the IR at 2260 cm$^{-1}$. At periodic intervals, samples were removed for infrared analysis until, after 1½ hours, the band at 2260 cm$^{-1}$ had vanished.

The reaction mixture was heated to a temperature of about 175°–180° C. and placed under vacuum to evaporate residual low-boiling components. The resulting urethane modified rosin-pentaerythritol ester was found to possess the following properties: AN=6.1; color=H; MW=990; softening pt(SP)=102° C.; active hydrogen=0.50, as determined by reacting the product with a measured excess of phenyl isocyanate, adding a precise amount of dibutylamine and titrating the excess amine with 0.5 N hydrochloric acid; viscosity=1400-1500 cps @ 150° C.

EXAMPLE 2

Preparation of Rosin-Pentaerythritol Reacted with Toluene-2,4-diisocyanate

To a suitable 3-necked reaction flask fitted with a stirrer, thermometer, addition funnel and nitrogen inlet and outlet, were added 6000 parts of a rosin-pentaerythritol ester of the same type and having the same properties as the ester described in Example 1 above. The ester was melted at a temperature between 155°–160° C. under a nitrogen atmosphere and 311 parts by volume of toluene-2,4-diisocyanate were slowly added to the ester, with stirring, over a period of one and one-half hours. A sample was taken and examined by infrared spectroscopy and found to contain a small isocyanate band. After an additional one hour reaction time, a slight excess of isocyanate was again seen by infrared. The reaction temperature was then increased to 185° C. and the reaction was stirred slowly to drive off volatile components and gases trapped in the melt.

The modified rosin ester product was found to have the following properties: AN=8.4; color of I; MW=1325; active hydrogen=0.50; softening point=122° C.; viscosity=17,000–17,400 cps @ 150° C.

EXAMPLE 3

Preparation of Rosin Ester of Dipentaerythritol

To a 2-liter, 4-necked flask, equipped with an inlet for nitrogen gas, a thermometer, stirrer, and a condensing system appropriate for the preparation of pentaerythritol esters, was charged 1000 g of rosin (Actinol ® type S rosin having the following properties: AN=174, color WW). The rosin was melted and a precise amount of dipentaerythritol, 224 g, 0.88 mole, was added to completely react with the rosin and theoretically yield a dipentaerythritol rosin ester containing approximately 3.5 ester groups per dipentaerythritol moiety. The reaction mixture was slowly heated to a temperature of between 270°–275° C. under an inert atmosphere and maintained at that temperature for 17 hours. The resulting product was found to have the following physical properties: AN=9.9; color of I-H, ring and ball softening pt (SP)=99° C.; MW=1040; degree of esterification (via NMR)=3.64/6.0.

EXAMPLE 4

Reaction of the Ester of Example 3 with Phenyl Isocyanate

To a one-liter, 3-necked flask (equipped with nitrogen gas inlet, thermometer, stirrer and addition funnel) was charged 400 g of the dipentaerythritol-rosin ester of Example 3. The ester was melted under an atmosphere of nitrogen at a temperature of 155° C. To the molten ester was added 103.6 ml (114.0 g, 0.955 mole) of the phenyl isocyanate previously described in Example 1. The temperature of the mixture was maintained between 155° and 160° C. One hour after completion of isocyanate addition, a sample was removed for infrared analysis. A strong isocyanate band at 2260 cm$^{-1}$ was found, indicating the presence of excess phenyl isocyanate. Incremental amounts of solid dipentaerythritol rosin ester were added, totaling 50 g, until the IR band at 2260 cm$^{-1}$ had diminished in intensity to a very small peak. The reaction product was then heated to a temperature of 200° C., while the system was purged with nitrogen to remove unreacted phenyl isocyanate and to allow trapped gas to escape. The resulting product was found to have the following properties: Color=I; An=2.6; SP=111° C.; MW=1230; degree of esterification (via NMR)=6.0/6.0; urethane content=7.7%.

The rosin color standards referred to in the examples are U.S.D.A. standads varying from X, the lightest, to D, the darkest color. The U.S.D.A. scale of colors is designated as follows: X, WW, WG, N, M, K, I, H, G, F, E and D.

In the above examples, the degree of esterification (percentage of reacted hydroxyl groups in the ester to available hydroxyl groups in the starting polyol) was determined by both NMR and active hydrogen methods. The NMR analysis is based on the integration of a proton spectrum where the ratio of CH$_2$O/CH$_2$OCO is obtained and from which the degree of esterification is calculated. Active hydrogen was determined by an analysis where the sample, dissolved in toluene, is reacted with a measured excess of phenyl isocyanate in the presence of stannous octoate catalyst for 2–2.5 hours. Subsequent addition of a precise excess of dibutylamine and titration with perchloric acid results in an active hydrogen value which when divided by 100 and subtracted from the number of hydroxyl groups in the polyhydric alcohol is converted into a degree of esterification.

Urethane content was obtained from the calculation:

$$\frac{\text{mole ratio } [\phi\text{NCO/rosin ester}] \times 43^{(1)}}{\text{MW of urethane modified ester}} \times 100$$

$$\text{i.e., } \frac{2.2 \times 43}{1233} \times 100 = 7.65$$

$^{(1)}$MW of —NHCO— moiety

EXAMPLE 5

Preparation of a Urethane Modified Pentaerythritol Ester Using Hexamethylene Diisocyanate Into a suitable flask fitted with thermometer, stirrer, nitrogen inlet and outlet are charged 600 g of pentaerythritol ester of rosin: AN 10.0, SP 96° C., MW 965, degree of esterification (via NMR) 3.25/4.0. The ester is heated to 150°–5° C., under N$_2$ and 27.8 g of hexamethylenediisocyanate (MW 168.2, b.p. 140°–1° C./16 mm) is added dropwise with stirring. Periodic samples were analyzed by infrared spectroscopy for the NCO band. The reaction is considered complete when a small positive isoayanate band (2260 cm$^{-1}$) was observed that did not change after an additional one-half hour of reaction time. The reaction temperature was raised to 190° C. for one-half hour and the reaction product discharged. The urethane-modified rosin-pentaerythritol ester possesses the following properties: AN 10.4, SP 109° C., MW 1470, degree of esterification 4.0/4.0, Color N.

In general, any rosin may be employed as the resin base for making the modified rosin esters in accordance with the invention. For example, gum, wood and tall oil rosins may be employed as the rosin component of the ester to be reacted with isocyanate.

Furthermore, although pentaerythritol and dipentaerythritol have been used and are preferred for making rosin esters which are modified by the present invention, other primary polyhydric alcohols may be employed instead as components of the rosin ester. For example, tripentaerythritol, trimethylolethane, trimethylolpropane, glycerol, diethylene glycol, 1,4-cyclohexanedimethanol and other polyhydric alcohols may also be employed.

The rosin is usually reacted without solvent with the primary polyhydric alcohol at temperatures from about 150° C. to about 300° C. Usually a small excess of the alcohol is used, although an excess of the rosin could be used in making the reaction mixture.

Suitable isocyanates for use in accordance with the present invention include aliphatic and aromatic isocyanates and diisocyanates. Specific isocyanates which may be used include: phenyl isocyanate, toluene-2,4-diisocyanate, hexamethylene diisocyanate, and methylene-bis-(4-phenyl isocyanate).

The following example demonstrates the advantage of the modified rosin esters of the invention over conventional unmodified rosin esters in use as tackifiers for adhesive compositions.

A mixture of 30 parts of the modified rosin ester product of Example 1 and 100 parts of B. F. Goodrich Estane ® 5716 Brand polar polyurethane material were comelted to form a hot melt adhesive. The molten adhesive (180°–190° C.) was placed on a kraft paper substrate and drawn down to a 1.5 mil thickness using a preheated (150° C.) Bird applicator. The hot melt substrate composite was then placed on, aligned and heat-sealed to a second substrate using the Sentinel ® Heat Sealer sold by Packaging Industries, Hyannis, Mass. The improvement in bond strength characteristics effected by use of the urethane modified rosin ester in the adhesive composition can be seen in the following table.

| Specific Adhesion of ESTANE 5716 Modified by Urethane modified ZONESTER | |
|---|---|
| | Bond Strength, oz./in |
| Sealing Temperature[1], °F. | 350° F. |
| Substrate[2] | Kraft |
| ESTANE 5716[3] | 11 |
| ESTANE 5716 + 30 phr | 13 |
| Urethane Modified ZONESTER 100[4] ESTANE 5716 + 30 phr ZONESTER 100 Not Modified | 8 |

[1]Sealing time, 0.5 sec.; jaw pressure, 10 psi.
[2]Adhesive coated kraft paper bonded to kraft paper
[3]Severe blocking occurred in samples that did not have esters included.
[4]φNCO modified ZONESTER 100, S.P. 102° C.

We claim:

1. A urethane-modified rosin ester of a primary polyhydric alcohol having from about 50% to about 95% of the hydroxyl groups of the alcohol esterified with rosin and the remaining hydroxyl groups of the alcohol modified by reaction with an aromatic or aliphatic isocyanate, with no more than negligible unreacted hydroxyl content.

2. The rosin ester of claim 1, wherein the primary polyhydric alcohol is pentaerythritol.

3. The rosin ester of claim 1 wherein the primary polyhydric alcohol is dipentaerythritol.

4. The rosin ester according to claim 2, wherin the isocyanate used to produce the urethane is phenyl isocyanate.

5. The rosin ester according to claim 2, wherein the isocyanate used to produce the urethane is toluene-2,4-diisocyanate.

6. A process for the preparation of an ester defined by claim 1, which comprises the steps of: reacting in amounts ranging from about 0.2 equivalent to 3.0 equivalents of an aromatic or aliphatic isocyanate with one mole of a rosin ester of dipentaerythritol, said rosin ester having between about 50% and about 95% of the hydroxyl groups of the alcohol esterified with rosin, at a temperature between about 25° C. and 200° C. and recovering an inert, polar urethane modified rosin ester having negligible hydroxyl content.

7. The process of claim 6, wherein the primary polyhydric alcohol is pentaerythritol or dipentaerythritol.

8. The process according to claim 7, wherein the aromatic isocyanate is phenyl isocyanate.

9. The process according to claim 7, wherein the aromatic isocyanate is toluene-2,4-diisocyanate.

* * * * *